UNITED STATES PATENT OFFICE.

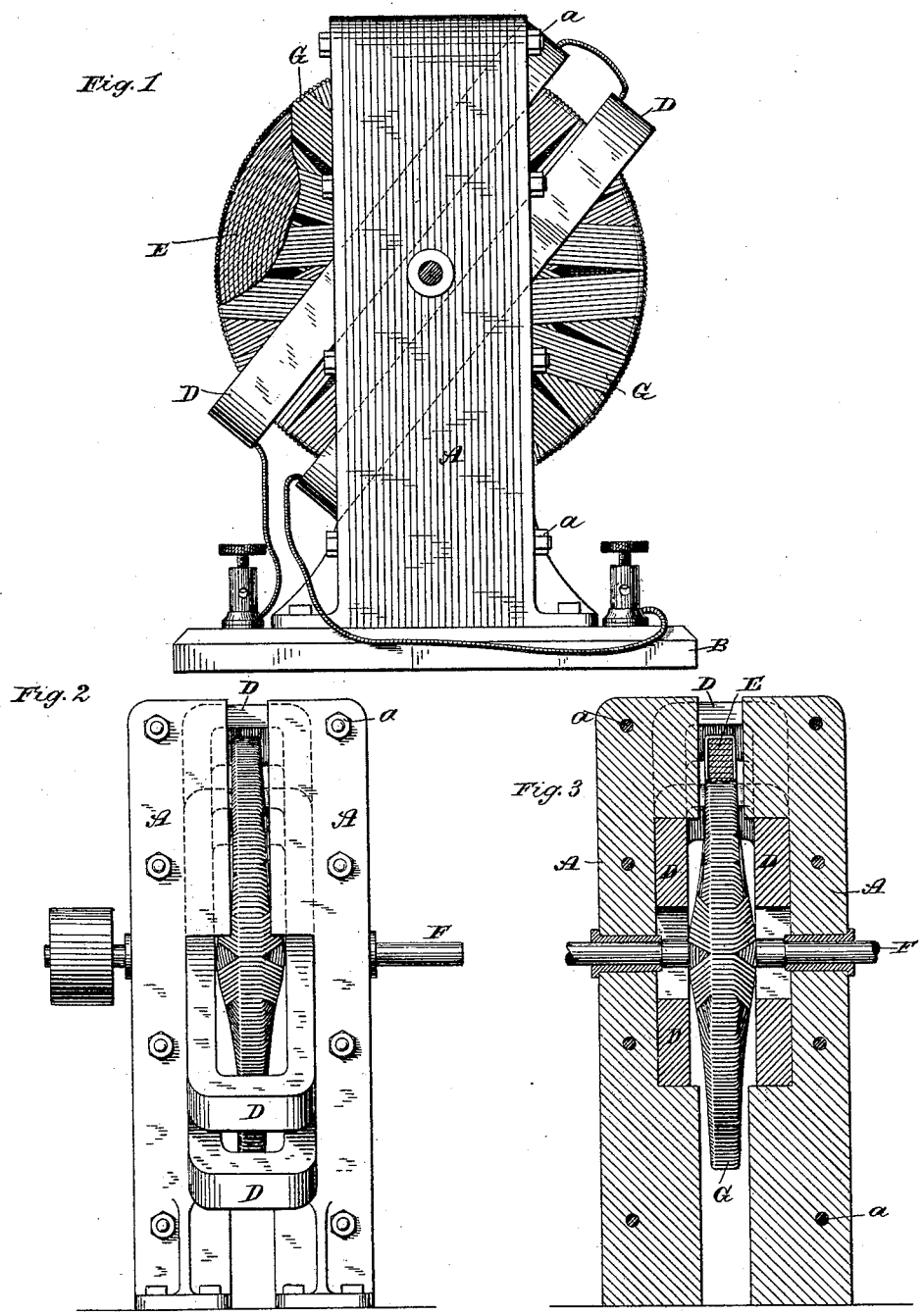

NIKOLA TESLA, OF NEW YORK, N. Y., ASSIGNOR TO THE TESLA ELECTRIC COMPANY, OF SAME PLACE.

ELECTRO-MAGNETIC MOTOR.

SPECIFICATION forming part of Letters Patent No. 405,858, dated June 25, 1889.

Application filed January 8, 1889. Serial No. 295,745. (No model.)

*To all whom it may concern:*

Be it known that I, NIKOLA TESLA, from Smiljan, Lika, border country of Austria-Hungary, a subject of the Emperor of Austria, residing at New York, in the county and State of New York, have invented certain new and useful Improvements in Electro-Magnetic Motors, of which the following is a specification, reference being had to the drawings accompanying and forming a part of the same.

In order to define more clearly the relations which the motor forming the subject of my present application bears to others of the class to which it pertains, I will recapitulate briefly the forms of alternating-current motors invented by me and described more in detail in my prior patents and applications. Of these there are two principal types or forms: first, those containing two or more energizing-circuits through which are caused to pass alternating currents differing from one another in phase to an extent sufficient to produce a continuous progression or shifting of the poles or points of greatest magnetic effect, in obedience to which the movable element of the motor is maintained in rotation; second, those containing poles or parts of different magnetic susceptibility, which under the energizing influence of the same current or two currents coinciding in phase will exhibit differences in their magnetic periods or phases. In the first class of motors the torque is due to the magnetism established in different portions of the motor by currents from the same or from independent sources, and exhibiting time differences in phase. In the second class the torque results from the energizing effects of a current upon parts of the motor which differ in magnetic susceptibility—in other words, parts which respond to the same relative degree to the action of a current, not simultaneously, but after different intervals of time. In my present invention, however, the torque, instead of being solely the result of a time difference in the magnetic periods or phases of the poles or attractive parts to whatever cause due, is produced by an angular displacement of the parts which, though movable with respect to one another, are magnetized simultaneously, or approximately so, by the same currents. This principle of operation I have embodied practically in a motor in which I obtain the necessary angular displacement between the points of greatest magnetic attraction in the two elements of the motor—the armature and field—by the direction of the lamination of the magnetic cores of said elements, and the best means of accomplishing this result of which I am at present aware I have shown in the accompanying drawings.

Figure 1 is a side view of the motor with a portion of its armature-core exposed. Fig. 2 is an end or edge view of the same. Fig. 3 is a central cross-section of the same, the armature being shown mainly in elevation.

Let A A designate two plates built up of thin sections or laminæ of soft iron insulated more or less from one another and held together by bolts *a* or any other suitable means and secured to a base B. The inner faces of these plates contain recesses or grooves in which a coil or coils D are secured obliquely to the direction of the laminations. Within the coils D is a disk E, preferably composed of a spirally-wound iron wire or ribbon or a series of concentric rings and mounted on a shaft F, having bearings in the plates A A. Such a device when acted upon by an alternating current is capable of rotation and constitutes a motor, the operation of which I explain in the following manner: A current or current-impulse traversing the coils D tends to magnetize the cores A A and E, all of which are within the influence of the magnetic field of the coils. The poles thus established would naturally lie in the same line at right angles to the coils D, but in the plates A they are deflected by reason of the direction of the laminations and appear at or near the extremities of said plates. In the disk, however, where these conditions are not present, the poles or points of greatest attraction are on a line at right angles to the plane of the coils; hence there will be a torque established by this angular displacement of the poles or magnetic lines, which starts the disk in rotation, the magnetic lines of the armature and field tending toward a position of parallelism. This rotation is continued and maintained by the reversals of the current in coils D D, which change alternately the polarity of the field-cores A A. This rotary tendency or effect will be greatly increased by winding the disk with conductors G, closed upon themselves and having a radial direction, whereby the magnetic intensity of the poles of the disk will be greatly increased by the energizing effect of the currents induced in the coils G by the alternating currents in coils D. The plan of winding and the principle of operation have been fully explained in my patent, No. 382,279, of May 1, 1888.

The cores of the disk and field may or may not be of different magnetic susceptibility—that is to say, they may both be of the same kind of iron, so as to be magnetized at approximately the same instant by the coils D; or one may be of soft iron and the other of hard, in order that a certain time may elapse between the periods of their magnetization. In either case rotation will be produced; but unless the disk is provided with the closed energizing-coils it is desirable that the above-described difference of magnetic susceptibility be utilized to assist in its rotation.

The cores of the field and armature may be made in various ways, as will be well understood, it being only requisite that the laminations in each be in such direction as to secure the necessary angular displacement of the points of greatest attraction. Moreover, since the disk may be considered as made up of an infinite number of radial arms, it is obvious that what is true of a disk holds, under well-understood conditions, for many other forms of armature, and my invention in this respect is in no sense limited to the specific form of armature shown.

It will be understood that the specific ways of carrying out this invention are almost without number, and that, therefore, I do not limit myself to the precise form of motor which I have herein shown.

I believe that I am the first to produce rotation of an armature, at least such as could be utilized for any general or practicable purposes, by means of an alternating current passing through a single coil or several coils acting as one, and which have a direct magnetizing effect upon the cores of both armature and field, and this I claim in its broadest sense.

I further believe that I am the first to impart directly, by means of an alternating current, magnetism to the cores of the two elements of a motor, and by the direction of the lamination of one or both of the same to produce an angular displacement of the poles or lines of magnetic force of the cores, respectively.

What I therefore claim is—

1. An electro-magnetic motor consisting of a field-magnet, a rotary armature, and a single coil adapted to be connected to a source of alternating currents and to impart magnetism to both the armature and the field-magnet with angular displacement of the maximum points, as set forth.

2. In an electro-magnetic motor, the combination, with a coil adapted to be connected with a source of alternating currents, of a field-magnet and rotary armature the cores of which are in such relation to the coil as to be energized thereby and subdivided or laminated in such manner as to produce an angular displacement of their poles or the magnetic lines therein, as set forth.

3. In an electro-magnetic motor, the combination, with a coil adapted to be connected with a source of alternating currents, of field-magnets with laminations lying obliquely to the plane of said coil and a circular or disk armature mounted to rotate between the field-magnets, both field and armature being under the magnetizing influence of the coil, as set forth.

4. In an electro-magnetic motor, the combination, with a coil adapted to be connected with a source of alternating currents, of field-magnets with laminations lying obliquely to the plane of the coil and a circular or disk armature with spiral or concentric laminations mounted between the field-magnets, both field and armature being under the magnetizing influence of the coil, as set forth.

5. In an electro-magnetic motor, the combination, with a coil adapted to be connected to a source of alternating currents, of a field-magnet and a rotary armature with closed coils thereon, both the field and the armature being under the magnetizing influence of said coil and laminated to produce an angular displacement of the poles of the two cores.

NIKOLA TESLA.

Witnesses:
EDWARD T. EVANS,
GEORGE N. MONRO.